Figure 1:
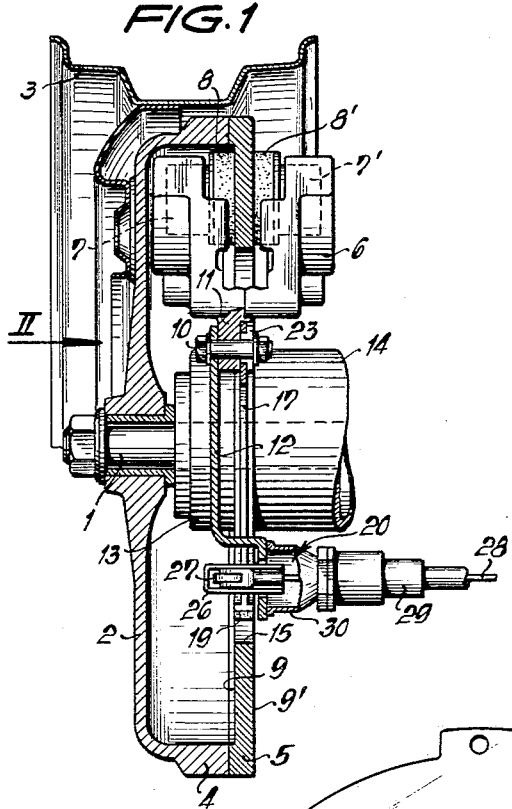

Feb. 25, 1964 N. VON RUCKER 3,122,221
DISK BRAKE FOR VEHICLES INCLUDING MANUALLY
OPERATED EXPANDING SHOE BRAKE
Filed Oct. 24, 1960 3 Sheets-Sheet 1

INVENTOR
Nikolaus von RÜCKER
BY Dicke, Craig & Freudenberg
ATTORNEYS

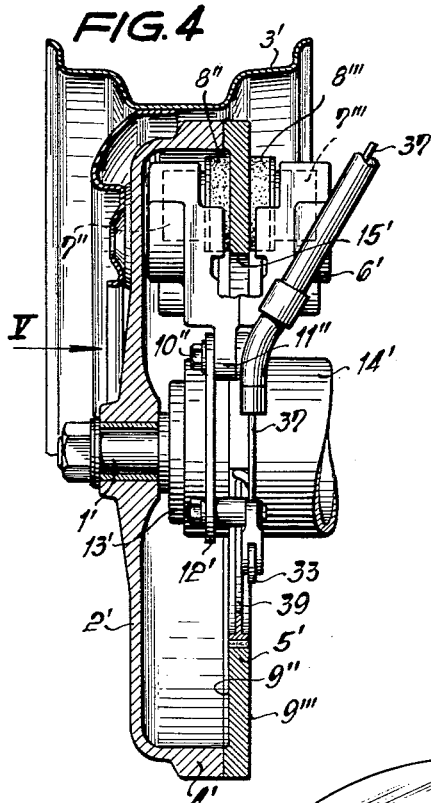
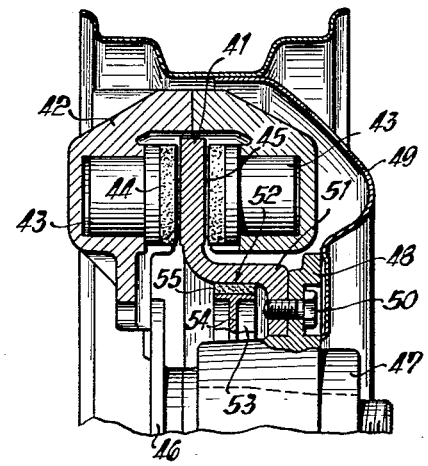
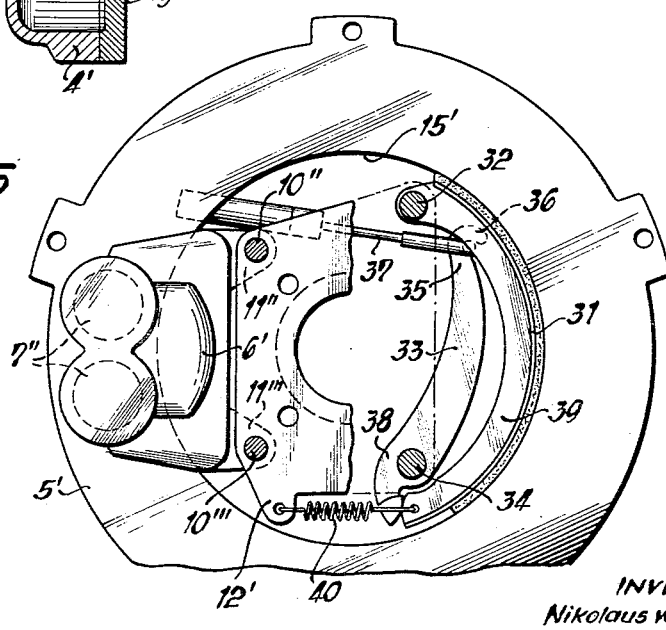

INVENTOR
Nikolaus von RÜCKER
ATTORNEYS

United States Patent Office 3,122,221
Patented Feb. 25, 1964

3,122,221
DISK BRAKE FOR VEHICLES INCLUDING MANUALLY OPERATED EXPANDING SHOE BRAKE
Nikolaus von Rucker, Stuttgart, Germany, assignor to Firma Dr. Ing. h. c. F. Porsche K.G., Stuttgart-Zuffenhausen, Germany
Filed Oct. 24, 1960, Ser. No. 64,497
Claims priority, application Germany Nov. 11, 1959
10 Claims. (Cl. 188—106)

The present invention relates to a disk brake for vehicles, especially motor vehicles, provided with a rotating brake disk which is surrounded by a brake clamp actuated by means of a pressure medium and which includes a manually operated brake adapted to be actuated independently thereof.

In the prior art constructions, the brake pistons of the hydraulic installation which engage the brake disk with the friction linings thereof serve as manually operated brake whereby actuating plungers are inserted into the cylinder space of the brake pistons which are actuated in turn by actuating or adjusting levers pivotally mounted at the brake clamp and connected with the manually operated brake handle by a pull cable or the like. The clamping effect of the pistons mechanically pressed against the brake disk, however, is not able to securely hold the vehicle, especially on a hill, which may be traced back in particular to the fact that disk brakes offer no servo-effect whereby the possible abutment pressure is limited. Additionally, the space which is available between the wheel dish and the wheel rim for the installation of the disk brake is relatively small whereby the accommodation of the brake clamp with the adjusting mechanism for the manually operated brake offers great difficulties and can be made possible only by the use of complicated and relatively expensive structural parts and elements. To this has to be added the fact that additional sealing surfaces are necessary by reason of the actuating plungers introduced into the cylinder space of the piston from the outside thereof whereby, notwithstanding careful construction, it is impossible to avoid that oil leaks occur thereat in due course of time.

It has also been proposed already in the prior art to arrange along the outer periphery of the brake disk a band brake constructed as manually operated hand brake. This, however, entails the disadvantage that the effective brake surface of the disk has to be kept correspondingly smaller and the actuating mechanism for actuating the band brake can be pivotally secured only on the brake clamp the accommodation of which within the wheel rim portion of the vehicle wheel which has to be braked is already difficult by itself. Accordingly, a complicated construction of the brake clamp results therefrom in such prior art constructions with the further disadvantage that the adjusting members of the hand brake, for example, for readjustments thereof are not readily accessible.

According to the present invention, these disadvantages are avoided by a construction in which the hand brake is operative along the inner periphery of the brake disk. This arrangement permits within the smallest space, and without reducing disadvantageously the braking surface of the brake disk to accommodate an effective hand brake within the wheel rim or wheel felly which does not impair the installation of the brake clamp of the hydraulic installation. The manually operated brake is preferably constituted by a shoe brake the brake surface of which is ararnged at the brake disk perpendicularly to the brake surface of the brake clamp. As a result thereof, any desired, relatively large abutment pressures are available for the hand brake whereby the brake disk does not require any special or additional machining.

According to one embodiment of the present invention, a shoe brake with two oppositely disposed brake shoes is provided as a hand brake which is supported on the bearing base of the brake clamp. A relatively large servo-effect is attained thereby, together with a safe absorption of the supporting forces, coupled with the further advantage that the independent brake may be used, in addition to its normal function as hand brake, as additional emergency brake if the hydraulic installation has become damaged, for example, by developing a leak in one of its lines. The arrangement according to the present invention is thereby so selected that the brake shoes are pivotally retained about securing bolt members of the brake clamp and are actuated by spreading levers which are arranged opposite the brake clamp. A favorable space distribution results therefrom whereby the actuating cable of the hand brake may be led axially to the brake without any large detours. The hand brake is thereby easily operated and readily accessible from the outside thereof.

According to another construction of the present invention, a single brake shoe acting against the inner diameter of the brake disk may also be provided as hand brake which is arranged opposite the brake clamp and supported on the securing flange thereof. This construction, though having a somewhat lesser braking effect by reason of the elimination of one brake shoe, is connected with relatively lower manufacturing costs and therefore particularly suitable for smaller vehicles with correspondingly lower weight of the vehicle. The actuation of the brake shoe takes place in this embodiment by a double-armed lever connected with the pull cable of the hand brake, the relatively shorter arm of which acts directly on a web portion of the brake shoe. The actuation is therefore kept relatively simple and may be advantageously accommodated inside of the brake disk.

It is advantageous for disk brakes surrounded on the outside thereof which have, for example, a brake disk angularly bent toward the wheel hub, if the angularly bent web portion of the brake disk serves as braking surface for a band brake or shoe brake. As a result thereof, the servo-effect of a friction brake is also available for disk brakes of this type of construction for purposes of safely holding the wheels of the vehicle without having to reduce the effective brake surface against which the brake linings of the hydraulic installation have to act. Additionally, the brake clamp is thereby free of any fastening means and, as a result thereof, may be manufactured in a simple manner as well as accommodated favorably within the wheel rim.

Accordingly, it is an object of the present invention to provide a disk brake which may also be used in connection with a manually operated brake and which eliminates the inadequacies and drawbacks of the prior art constructions.

It is another object of the present invention to provide a disk brake construction in which the braking disk is also used in connection with the hand brake and which is so constructed and arranged in relation thereto as to assure a safe holding of the wheels even when the vehicle is parked on a hill.

A further object of the present invention resides in the provision of a manually operated brake, adapted to be used also as emergency brake, which is independent of the hydraulic installation of a disk brake and which makes use of the brake disk without necessitating any reduction in the effective braking surface thereof for the hydraulic installation.

Still a further object of the present invention resides in the provision of a hand brake which is independent of the hydraulic actuating installation of a disk brake but cooperates with the brake disk thereof and which is so constructed as to be readily accommodated within the wheel rim and within the brake disk without necessitating complicated structural elements which are relatively expensive to manufacture.

A further object of the present invention resides in the provision of a manually operated brake cooperating with the brake disk of a hydraulically actuated disk brake which reduces to a minimum the space necessitated for the hand brake and which enables a lead-in of the actuating cable essentially axially of the hand brake.

Still another object of the present invention resides in the provision of a manually operated brake, readily accommodated in the space between the wheel dish and wheel rim, which utilizes a servo-effect notwithstanding its cooperation with the brake disk of a disk brake installation so as to enable relatively high brake abutment forces by the servo-effect obtainable with the hand brake.

Another object of the present invention resides in the provision of a manually operated brake adapted to be used in connection with a disk brake installation which is compact so as to be capable of installation within a relatively small space, consists of relatively simple parts and is effective and reliable in operation.

Figure 3:
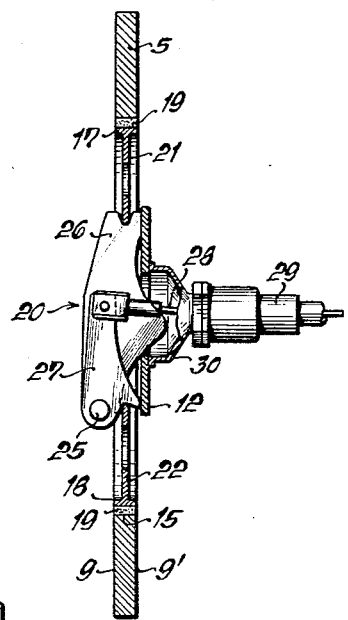
Figure 2:
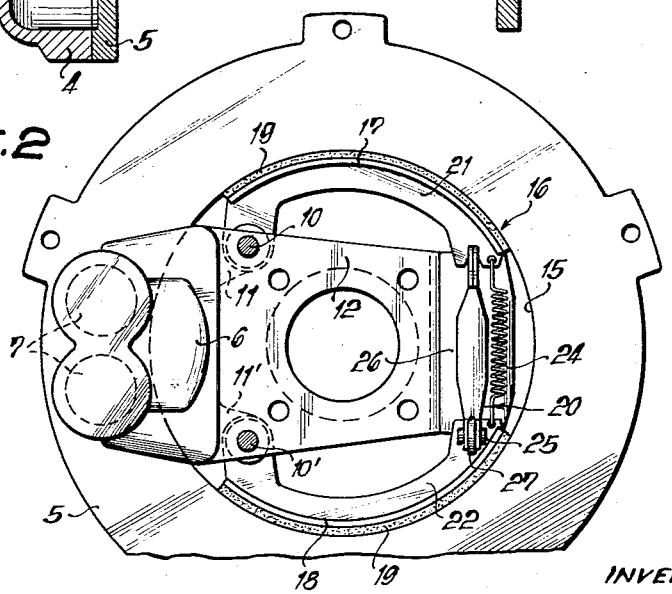
Figure 7:
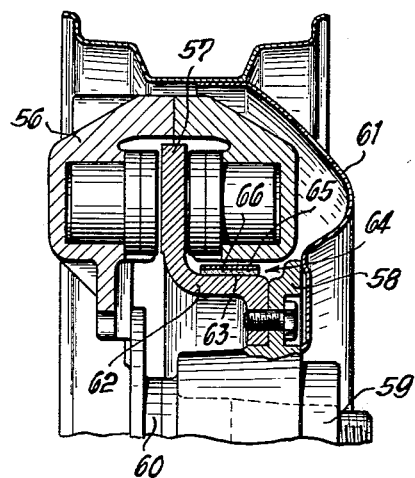
Figure 8:
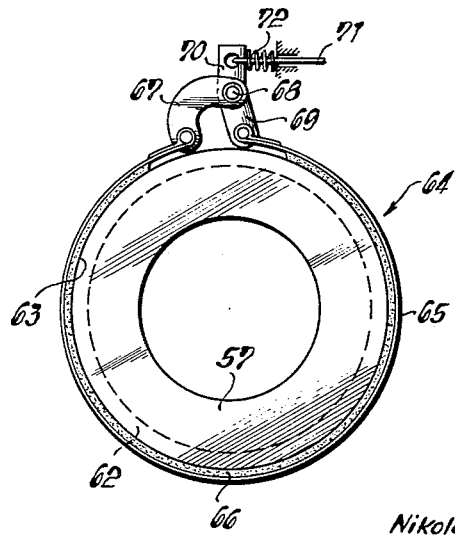

These and other objects, features and advantages of the present invention will become more obvious from the following description when taken in connection with the accompanying drawing which shows, for purposes of illustration only, four embodiments in accordance with the present invention, and wherein FIGURE 1 is a cross-sectional view through a disk brake arranged within the wheel rim of a motor vehicle and provided with a hand brake mechanism according to the present invention, FIGURE 2 is a side elevational view of the disk brake of FIGURE 1 in the direction of arrow II, rotated at 90° with respect thereto, with the disk carrier removed for purposes of clarity, FIGURE 3 is a cross-sectional view through the spreading lever mechanism together with the surrounding parts of the brake disk in accordance with the present invention as illustrated in FIGURES 1 and 2, FIGURE 4 is a cross-sectional view through a modified embodiment of a disk brake provided with a hand brake including a brake shoe according to the present invention, FIGURE 5 is a side elevational view of the disk brake of FIGURE 4, in the direction of arrow V, rotated at 90° with respect thereto, with the disk carrier again removed for clarity's sake, FIGURE 6 is a cross-sectional view through a part of a disk brake surrounded on the outside thereof and provided with a hand brake in accordance with the present invention constructed as a shoe brake, FIGURE 7 is a cross-sectional view through a disk brake according to FIGURE 6 provided with a band brake serving as a hand brake, and FIGURE 8 is a simplified view, on a reduced scale, of the brake actuating mechanism for the embodiment according to FIGURE 7.

Referring now to the drawing wherein like reference numerals are used throughout the various views to designate corresponding parts, and more particularly to FIGURES 1, 2, and 3, reference numeral 1 designates therein the axle drive shaft with which is operatively connected a carrier or support 2 on which is mounted or by which is carried the wheel rim 3. The support or carrier 2 includes a rim flange 4 which serves for purposes of holding a brake disk 5. The brake disk 5 is surrounded over a portion of the periphery thereof on the inside thereof by a two-partite brake clamp 6. The brake clamp 6 includes two oppositely disposed actuating pistons 7 and 7' which guide the brake lining supports 8 and 8' coordinated thereto axially against the brake surfaces 9 and 9'. The brake surfaces 9 and 9' act thereby perpendicularly to the wheel axis. The mounting of the braking clamp 6 takes place by means of mounting bolts 10 and 10' arranged at a distance from each other which connect extensions 11 and 11' of the brake clamp 6 with a flange 12 which in turn is retained in position between the bearing cover 13 and the axle tube 14 of the rear axle. The inner periphery 15 of the brake disk 5 serves as braking surface for a manually operated brake generally designated by reference numeral 16 (FIGURE 2) which is constructed as a friction brake with two brake shoes 17 and 18. The brake shoes 17 and 18 act against the brake disk 5 perpendicularly to the brake surfaces 9 and 9' of the actuating pistons 7 and 7'. The brake shoes 17 and 18 which are provided with a brake lining 19 are under the influence of a spreading mechanism 20 which is arranged between the web portions 21 and 22 of the brake shoes 17 and 18. The brake shoes 17 and 18 are pivotally supported within bushings 23 (FIGURE 1) about the mounting screws or bolts 10 and 10' of the brake clamp 6 at the extension 11 and 11' thereof and are pretensioned against one another by a return spring 24. The spreading mechanism 20 includes a lever 26 pivotally supported about a bolt 25 which lever 26 engages with the web portion 21 of the brake shoe 17. A further relatively shorter lever 27 which is also pivotally mounted about the bolt member 25 is in engagement with the web portion 22 of the brake shoe 18. A pull cable 28 led axially against the disk 5 is pivotally secured at the lever 27 which cable 28 is adjustably guided through a bolt member 29 within a bracket member 30. The bracket 30 is rigidly connected with the securing flange 12 of the brake clamp 6. The pull cable 28 is pivotally secured at the handle or actuating lever (not shown) of a hand brake arranged within the vehicle body.

*Operation*

If for purposes of holding the vehicle, the hand brake is pulled up, then the pull cable 28 displaces the lever 27 about the bolt 25 whereby the lever 27 abuts against the web portion 22 of the brake shoe 18. As a result thereof, the brake shoe 18 slides radially outwardly about the mounting bolt 10' as its pivot point and comes with the lining 19 thereof into abutment against the brake surface 15 of the brake disk 5. The abutment moment transmits itself also to the lever 26 which thereby also presses the brake shoe 17 through the web portion 21 against the brake surface 15 in opposition to the effect of the return spring 24. Together with the hand brake of identical construction on the other vehicle side, a safe holding of the vehicle is assured by the hand brake according to the present invention. After releasing the hand brake, the return spring 24 returns the brake shoe 17 and 18 as well as the spreading levers 26 and 27 into the original positions thereof.

By reason of the oppositely disposed arrangement of the brake clamp 6 and spreading mechanism 20 there remains within the brake disk 5 sufficient space for the accommodation of equally-dimensioned brake shoes having relatively large brake surfaces. If the available brake surface 15 at the inner periphery of the brake disk 5 is not sufficient, for example, for relatively heavy vehicles such as buses, trucks, or the like, then the brake surface of the brake disk may be made of larger width corresponding to the prevailing requirements thereof, for example, by a rim portion projecting inwardly and/or outwardly with respect to the brake surfaces 9 and 9' which would be connected with and would involve only relatively slight larger costs.

An embodiment is illustrated in FIGURES 4 and 5 in which the manually operated brake includes a single brake shoe. The remainder of the construction of the disk brake corresponds to the construction of FIGURES 1 to 3, and for that reason similar parts are designated with the same, though primed reference numerals.

A support or carrier 2' is again operatively connected, for example, by a spline connection with the axle drive shaft 1' which support 2' carries the wheel rim 3' and the wheel flange 4' for purposes of holding the brake disk 5'. The brake disk 5' is inwardly surrounded by a brake clamp 6' which contains two oppositely disposed actuating pistons 7" and 7'". The pistons 7" and 7'" cooperate with brake lining supports 8" and 8'" which are axially guided against the brake surfaces 9" and 9'" of the brake disk 5'. The securing of the brake clamp 6' takes place, as in the first-mentioned embodiment, by screws or bolts 10" and 10'" which connect extensions 11" and 11'" of the brake clamp 6' with a flange 12' which in turn is retained between the bearing cover 13' and the tubular axle member 14' of the rear wheels. A brake shoe 31 engages with the inner diameter 15' of the brake disk 5' opposite the brake clamp 6' which brake shoe 31 is pivotally mounted about a bolt member 32 connected with the flange 12'. For purposes of actuating the brake shoe 31 there is provided a double-armed lever 33 which is pivotally mounted at the flange 12' about a pivot pin 34. The relatively longer arm 35 of the lever 33 is provided with a hook portion 36 in which engages a pull cable 37 connected with the hand brake lever (not shown). The relatively shorter arm 38 of the lever 33 is angularly bent (FIGURE 5) against the web portion 39 of the brake shoe 31 and abuts against the same. As the hand brake is pulled up, the pull cable 37 moves toward the left as viewed in FIGURE 4 of the drawing, whereby the lever 33 is pivoted about the bolt member 34 in such a manner that the shorter arm 38 presses the brake shoe 31 in opposition to the effect of the return spring 40, against the brake surface 15' of the brake disk 5' and thereby holds the wheel. Upon releasing the hand brake, the return spring 40 returns the brake shoe 31 and therewith the lever 33 into the original initial position thereof.

FIGURE 6 illustrates a modified embodiment in which the brake disk 41 of the disk brake is surrounded on the outside thereof by a brake clamp 42 made in two parts. Each half of the brake clamp 42 contains a piston 43 actuated by a pressure medium which piston 43 guides a brake lining support 44 against the brake surface 45 of the disk 41. The brake clamp 42 is connected with an axle spindle 46 on which a wheel hub 47 is rotatably supported. The wheel hub 47 includes a flange 48 for holding or retaining a wheel rim 49. The brake disk 41 is secured simultaneously at the flange 48 by means of several bolts or screws 50 arranged and distributed along the circumference thereof. For that purpose, the brake disk 41 is provided with an angularly bent web portion 51 the inner diameter 52 of which serves as brake surface for a manually operated brake 53. The manually operated brake 53 includes one or several brake shoes 54 which are each provided with a brake lining 55. The actuation of the brake shoe 54 takes place by the same means as illustrated in FIGURES 1 to 5 which, for that reason, have not been illustrated in FIGURE 6. By the use of the angularly bent web portion 51 of the brake disk 41 as brake surface for the hand brake there results a good spatial utilization of the space present within the wheel rim 49.

In the embodiment of FIGURES 7 and 8, there is provided a band brake in the place of the shoe brake of FIGURE 6 for holding the vehicle wheels. The brake disk 57 which is surrounded on the outside thereof by the brake clamp 56 is angularly bent toward a flange 58 of the wheel hub 59 and is suitably connected therewith. The wheel hub 59 is rotatably secured on an axle spindle 60 and carries the wheel rim 61. The angularly bent web portion 62 of the brake disk 57 is, as in the embodiment of FIGURE 6, constructed as brake surface 63 with which engages a band brake 64. The brake band 65 is provided with a friction lining 66 which closely surrounds the cylindrically shaped web portion 62. One of the ends of the brake band 65 is pivotally secured at a lever 67 (FIGURE 8) which is supported on an adjusting pivot or shaft 68. The other end of the brake band 65 engages with a double-armed lever 69 which is also connected with the adjusting shaft 68. The pull cable 71 of the hand brake is connected with the shorter arm 70 of the lever 69. Upon actuation of the brake, the levers 67 and 69 are moved against one another in the manner of the nose portions of pliers whereby the brake band 65 is pressed against the brake surface 63. Upon release of the brake, a spring 72 cooperating with the arm 70 returns the levers 67 and 69 into the original position thereof with the result that the brake band 65 is released.

While I have shown and described several embodiments in accordance with the present invention, it is understood that the same is not limited thereto but is susceptible of many changes and modifications within the spirit and scope of the present invention.

Thus, for example, it is of no significance insofar as the present invention is concerned whether the manually operated brake is arranged at the front and/or rear wheels of the vehicle. Additionally, it is within the scope of the present invention to select as a hand brake a brake construction combination consisting of shoe and band brakes.

Thus, it is obvious that the present invention is susceptible of many changes and modifications within the spirit and scope thereof, and I therefore do not wish to be limited to the details shown and described herein but intend to cover all such changes and modifications as are encompassed by the scope of the appended claims.

I claim:

1. A brake disk construction for vehicles, especially motor vehicles, comprising an annular brake disk means having an inner circumference extending essentially parallel to the axis thereof, brake clamp means surrounding said brake disk means and including actuating means actuated by a pressure medium, and hand brake means including operating means effective independently of the actuating means of said brake clamp means and including means operative to effectively engage said inner circumference of said brake disk means.

2. A brake disk construction for vehicles, especially motor vehicles, comprising an annular brake disk means having an inner circumference, pressure-medium-actuated brake clamp means surrounding said brake disk means and adapted to provide a brake engaging force essentially in the axial direction of said brake disk means, and hand brake means including operating means actuated independently of said brake clamp means and including braking means operative to act effectively against said inner circumference of said brake disk means at essentially right angle to said axial direction.

3. A brake disk construction according to claim 2, wherein said braking means includes a shoe brake mechanism.

4. A brake disk construction according to claim 2, wherein said braking means includes shoe brake means provided with two oppositely disposed brake shoes, bearing means for said brake clamp means, and means for supporting said oppositely disposed brake shoes on said bearing means.

5. A brake disk construction according to claim 4, wherein said supporting means includes securing bolt means for pivotally securing said brake shoes to said bearing means, and spreading lever means operative to engage with said brake shoes and disposed opposite said clamping means.

6. A brake disk construction according to claim 2, wherein said braking means includes a single brake shoe means operative to engage the inner circumference of said brake disk means, said brake shoe means engaging said inner circumference at a point of the annular brake disk means essentially diametrically opposite to said brake clamp means, said brake clamp means including a securing flange, and said brake shoe means being supported on said securing flange.

7. A brake disk construction according to claim 6, wherein said operating means for actuating said brake shoe comprises a double-armed lever having a relatively long lever arm and a relatively short lever arm, said hand brake means further including pull cable means operatively connected with the relatively long lever arm of said double-armed lever, the relatively shorter arm of said double-armed lever engaging directly with said brake shoe means.

8. A brake disk construction for vehicles, especially motor vehicles, comprising an annular brake disk means having brake surface means extending essentially perpendicularly to the rotary axis thereof and an inner circumference extending essentially parallel to said axis, brake clamp means surrounding said brake disk means and adapted to engage with said brake surface means, and hand brake means including operating means actuated independently of said brake clamp means and including braking means operative to effectively engage said inner circumference of said brake disk means.

9. A brake disk construction for vehicles especially motor vehicles, comprising an annular brake disk means having an inner circumference extending essentially parallel to the axis thereof, brake clamp means surrounding said brake disk means and adapted to exert a braking force on said disk means extending in the axial direction thereof, actuating means for said brake clamp means, hand brake means disposed essentially inside of said brake disk means and including braking means acting against said inner circumference of the brake disk means in a direction essentially perpendicular to the braking force of said brake clamp means and means for actuating said braking means independently of said brake clamp means.

10. A brake disk construction according to claim 9, wherein said braking means includes shoe brake means provided with two oppositely disposed brake shoes, bearing means for said brake clamp means, means for supporting said oppositely disposed brake shoes on said bearing means, and spreading lever means operative to engage with said brake shoes and disposed opposite said clamping means.

References Cited in the file of this patent
UNITED STATES PATENTS

| | | |
|---|---|---|
| 395,681 | Aitken | Jan. 8, 1889 |
| 1,731,499 | Myers | Oct. 15, 1929 |
| 1,822,554 | Whyte | Sept. 8, 1931 |
| 2,701,626 | Walther | Feb. 8, 1955 |

FOREIGN PATENTS

| | | |
|---|---|---|
| 231,493 | Australia | Oct. 14, 1960 |
| 713,819 | France | Aug. 24, 1931 |
| 706,050 | Great Britain | Mar. 24, 1954 |
| 706,640 | Great Britain | Mar. 31, 1954 |